(12) United States Patent
Pellegrini et al.

(10) Patent No.: US 10,128,640 B2
(45) Date of Patent: Nov. 13, 2018

(54) RETROFITTING DEVICE FOR MEDIUM VOLTAGE SWITCHGEAR

(71) Applicant: ABB Schweiz AG, Baden (CH)

(72) Inventors: Fabio Pellegrini, Bergamo (IT); Stefano Magoni, Osio Sotto (IT); Carlo Gemme, Pavia (IT); Giorgio Magno, Brembate di Sopra (IT)

( * ) Notice: Subject to any disclaimer, the term of this patent is extended or adjusted under 35 U.S.C. 154(b) by 0 days.

(21) Appl. No.: 15/534,704

(22) PCT Filed: Nov. 11, 2015

(86) PCT No.: PCT/EP2015/076315
§ 371 (c)(1),
(2) Date: Jun. 9, 2017

(87) PCT Pub. No.: WO2016/091519
PCT Pub. Date: Jun. 16, 2016

(65) Prior Publication Data
US 2018/0138670 A1    May 17, 2018

(30) Foreign Application Priority Data

Dec. 9, 2014  (EP) .................................... 14197037

(51) Int. Cl.
*H02B 3/00*       (2006.01)
*H02B 11/04*      (2006.01)
(Continued)

(52) U.S. Cl.
CPC .............. *H02B 3/00* (2013.01); *H02B 11/04* (2013.01); *H02B 11/12* (2013.01); *H02B 13/0358* (2013.01)

(58) Field of Classification Search
USPC ................................................ 361/605–621
See application file for complete search history.

(56) References Cited

U.S. PATENT DOCUMENTS

| 8,916,786 B2 * | 12/2014 | Gemme ................. | H02B 11/04 |
| | | | 200/50.23 |
| 9,559,500 B2 * | 1/2017 | Carera ................... | H02B 11/04 |
| | | (Continued) | |

FOREIGN PATENT DOCUMENTS

EP    2672589 A1    12/2013

OTHER PUBLICATIONS

International Search Report and Written Opinion for Application Serial No. PCT/EP2015/076315, completed Jan. 19, 2016, 10 pages.

*Primary Examiner* — Zachary M Pape
(74) *Attorney, Agent, or Firm* — Taft Stettenius & Hollister LLP; J. Bruce Schelkopf

(57) ABSTRACT

A retrofitting device for medium voltage panels which comprises a plurality of first and second horizontal CB contacts aligned in a first and second horizontal plane, a plurality of first and second vertical SWG contacts aligned in a first and second vertical plane, a first bar assembly comprising first connection elements for connecting each of said first horizontal CB contacts with a corresponding first vertical SWG contact, a second bar assembly comprising second connection elements for connecting each of said second horizontal CB contacts with a corresponding second vertical SWG contact, said first connection elements comprising a first portion and a second portion linked to each other and free to change the angular position with respect to each other in a vertical plane when in an unlocked condition, said second connection elements comprising a third portion and a fourth portion linked to each other and free to change the angular position with respect to each other in a vertical plane when in an unlocked condition, first locking means being provided to lock the first with second portions and the third with the fourth portions in a desired position in which said first horizontal CB contacts and said second horizontal (Continued)

CB contacts are positioned on a substantially same vertical plane.

20 Claims, 16 Drawing Sheets

(51) Int. Cl.
*H02B 11/12* (2006.01)
*H02B 13/035* (2006.01)

(56) References Cited

U.S. PATENT DOCUMENTS 9,728,922 B2 * 8/2017 Carera ................... H02B 11/04
2012/0228097 A1   9/2012 Gemme et al.

* cited by examiner

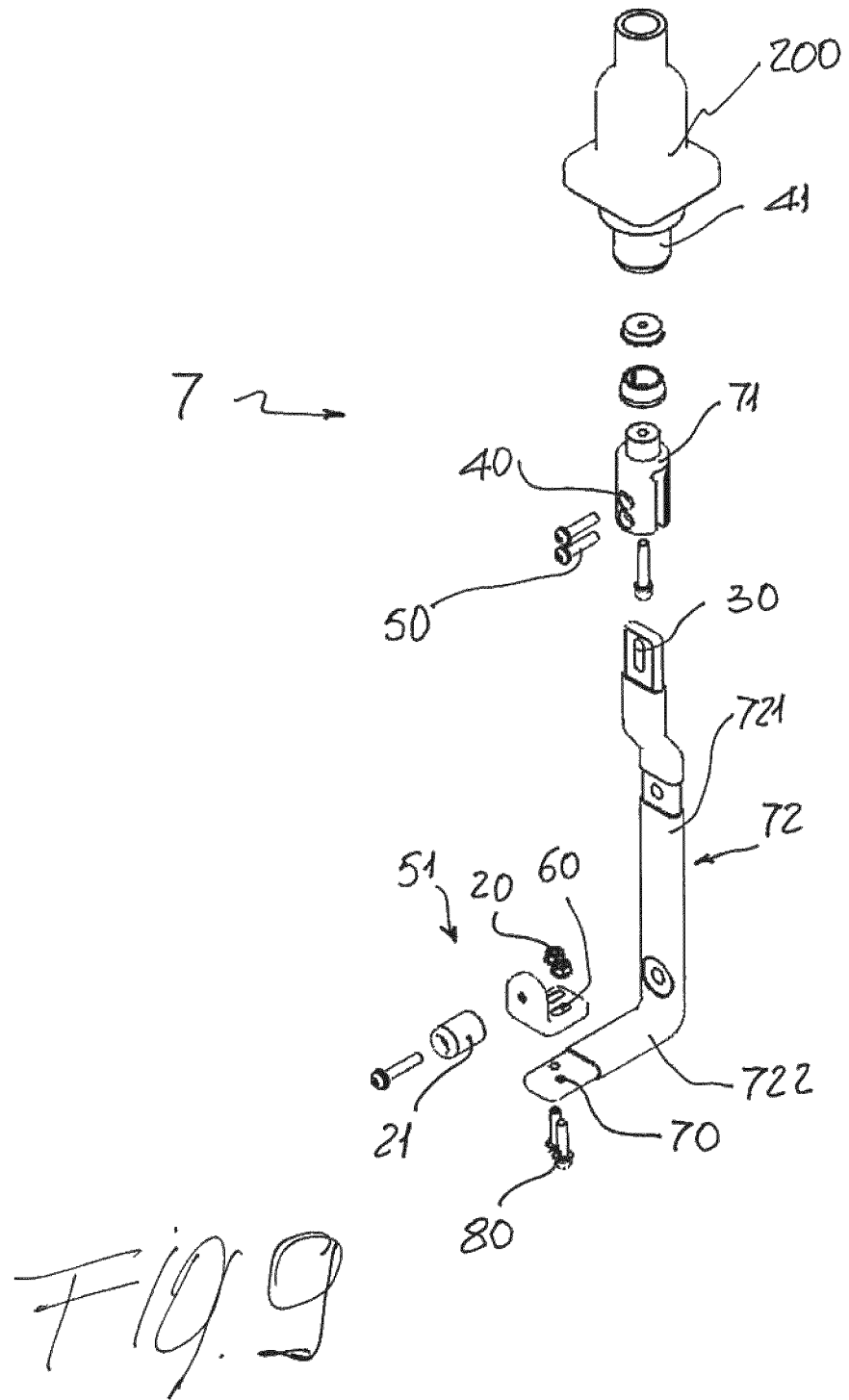

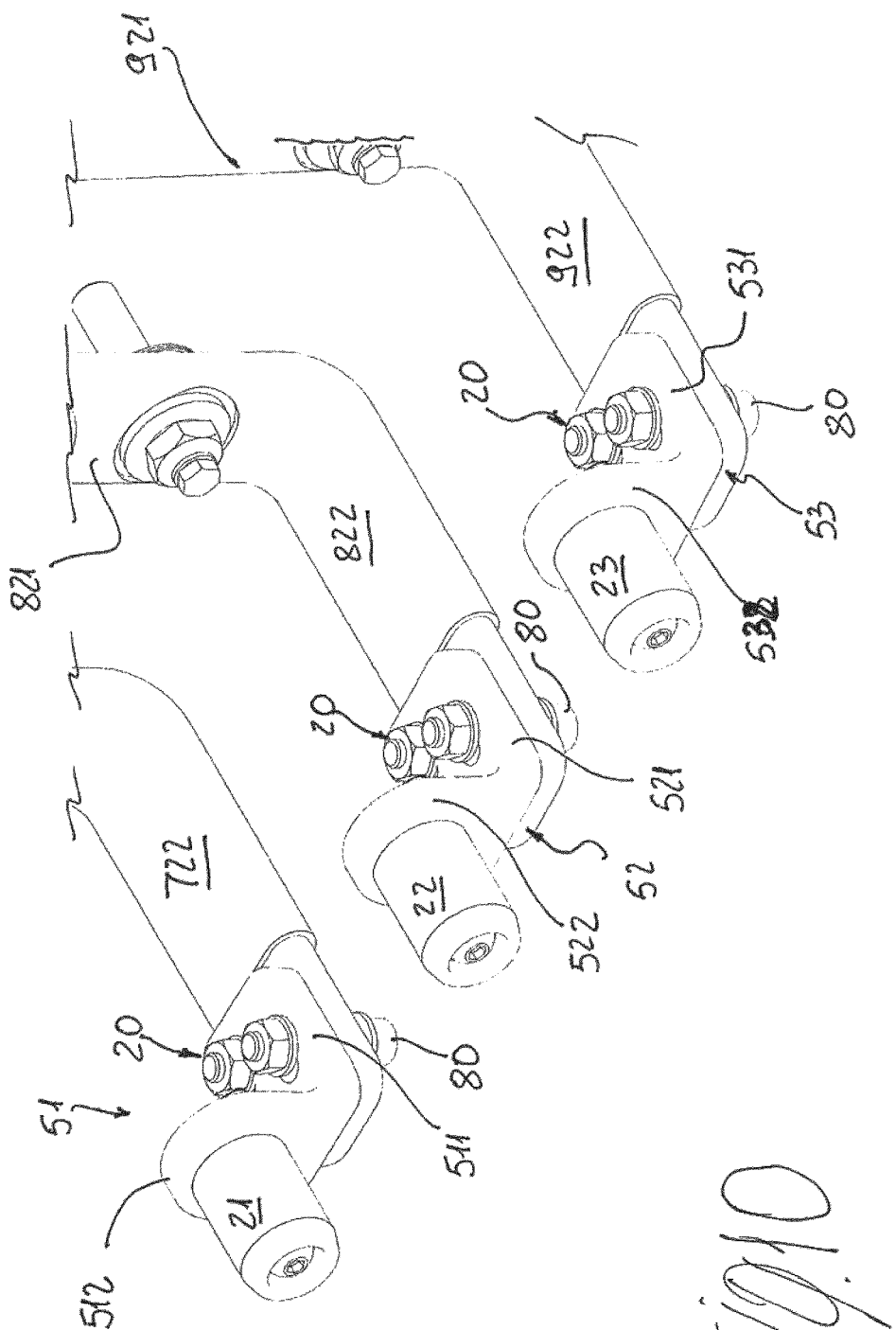

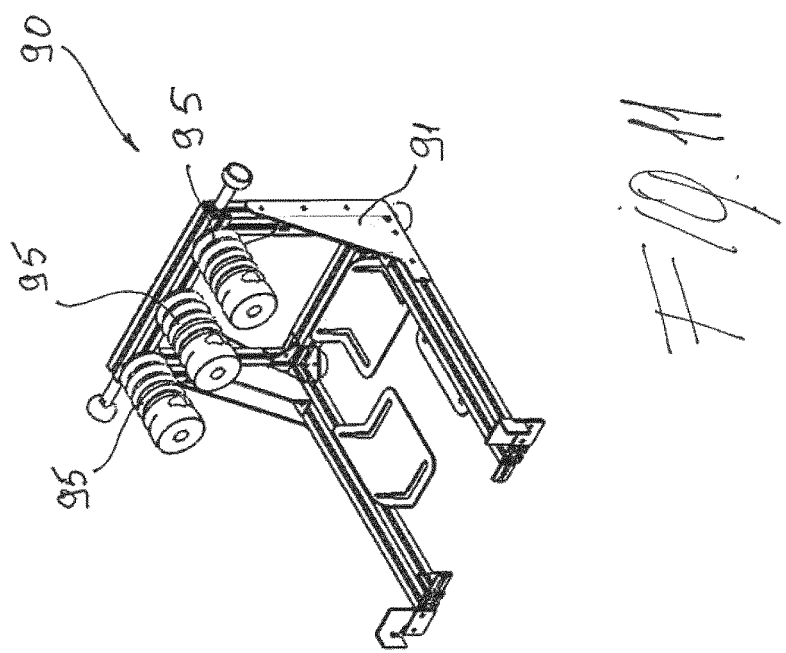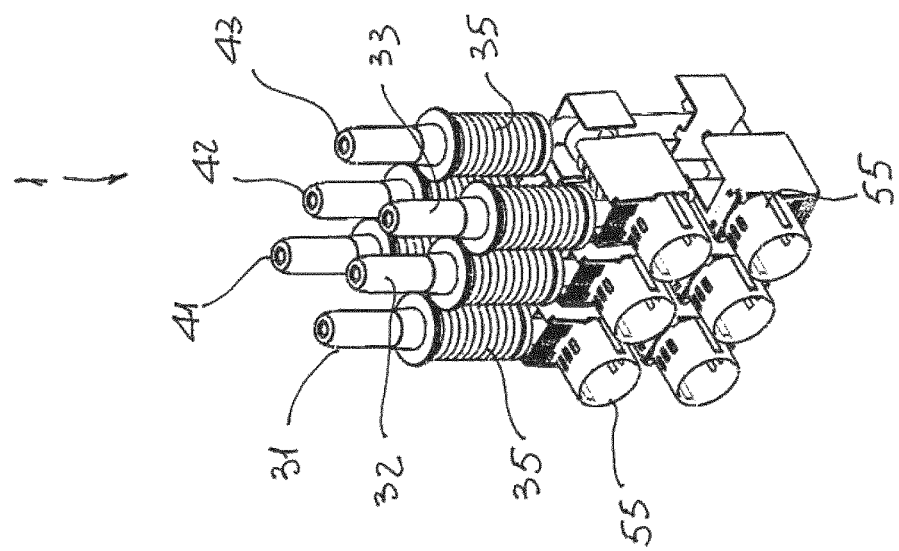

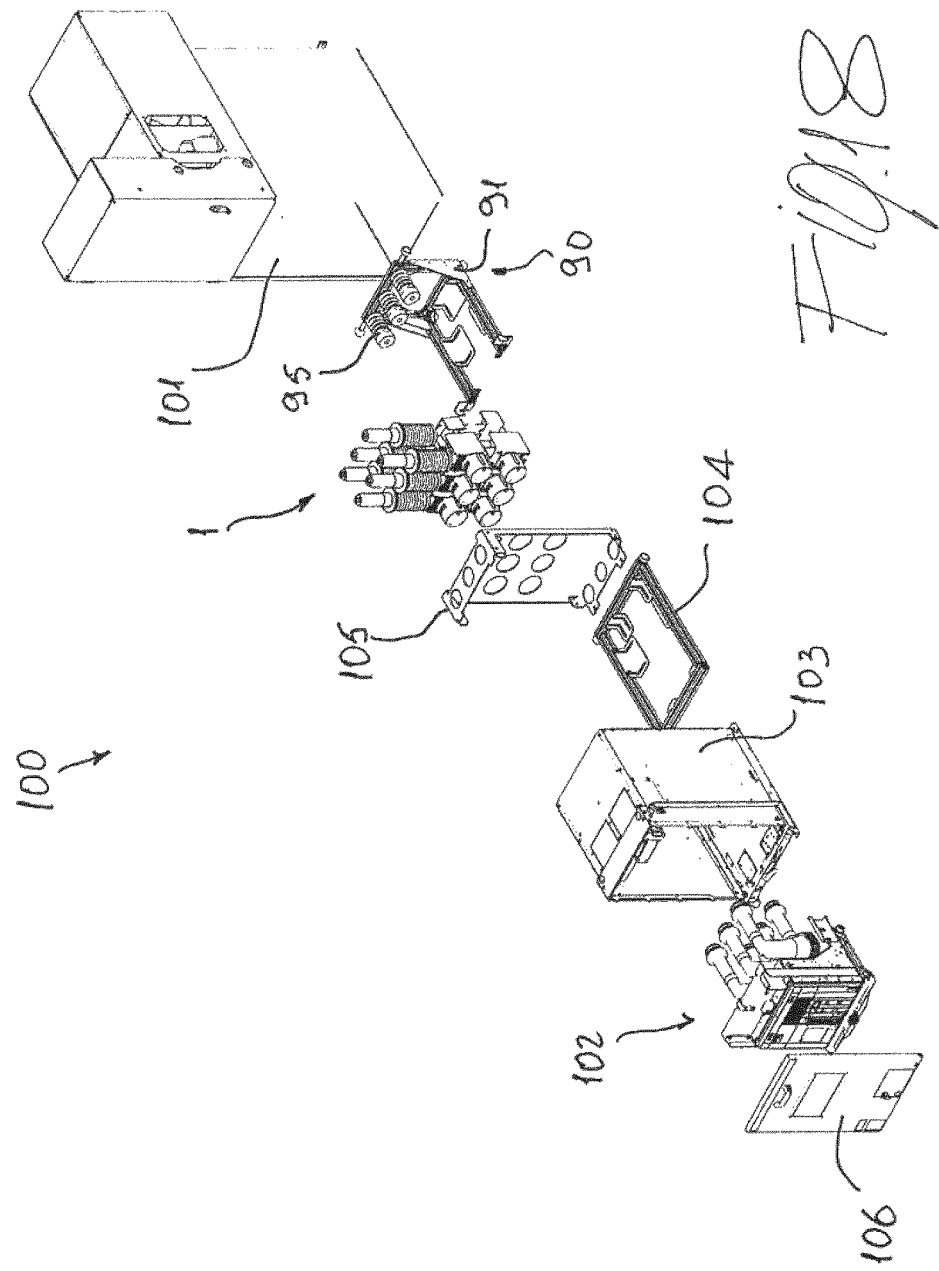

RETROFITTING DEVICE FOR MEDIUM VOLTAGE SWITCHGEAR

The present invention relates to a retrofitting device for medium voltage panels, and to a related medium voltage panel using such a retrofitting device. For the purposes of the present invention, the definition "medium voltage" refers to applications in the voltage range between 1 kV and 52 kV.

The use of switchgear panels is well known in the field of electrical distribution. From a structural point of view, known switchgear panels, which can be also indicated with the equivalent terms of electric switchboards, or simply switchgear or panels, or similar definitions, usually comprise a metallic cubicle that is internally divided into several compartments or cells housing various apparatuses and equipment. For example, one compartment houses a switching unit, such as a circuit breaker; a second compartment houses main connections, such as bus-bars, feeding power from an electrical source; a further compartment houses a system of cables suitable to be connected to a load, for example an electrical motor.

In particular, the circuit breaker, when in operation is connected in input and output to corresponding contact pieces associated with a source side (e.g. bus-bars) and a load side (e.g. other conductors or cables), respectively, of a circuit to which it is associated. In case of faults occurring along the associated circuit, the circuit breaker intervenes and interrupts the flow of current. In a particular type of electrical panels, also referred to as vertical lift panels, the connection between the contact terminals of the circuit breaker and the contact pieces (source side and a load side) of the panel takes place along a vertical insertion direction of the contact terminals of the circuit breaker into the contact pieces of the panel.

It is known that in existing medium voltage panels there is a need over the years to replace existing apparatuses and devices, in particular the circuit breakers, for a number of reasons, such as: failures or end of the useful life of the circuit breaker, need of improved or different performances of the circuit breaker, updating/revamping of the switchboard to adapt it to different use conditions or new standards, and similar needs. Moreover, a replacement may be also temporarily needed during the working life of the circuit breaker, for example due to maintenance interventions which may require long time.

In all cases, such replacements entail some problems, either because the circuit breaker to be replaced is very old and therefore not produced any more by the original manufacturer or because the user wishes to use circuit breakers produced and marketed by different manufacturers.

Hence, a problem of compatibility may arise between the circuit breaker to be used and the structural and/or functional characteristics of the existing panel into which the new circuit breaker has to be installed. For example, the distance between the pre-existing contact pieces of the electric circuit may be totally different and unsuitable with respect to the distance of the corresponding input and output connection contacts of the circuit breaker.

Such compatibility problems are particularly serious in the case of vertical panels in which it is desired to replace the existing circuit breaker having vertical connection contacts, with a new standard-type circuit breaker, which is usually of the withdrawable type, having horizontal connection contacts.

One rather expensive solution adopted to face this issue is to replace the entire switchgear panel instead of retrofitting it by simply replacing only the circuit breaker.

Another solution foresees to replace the old circuit breaker with a new one modified case by case in order to customize it with the specific existing switchgear panel; or in alternative, to modify the existing switchgear panel in order to adapt it to the new circuit breaker under installation.

Clearly, such a customized approach requires an extensive use of highly qualified resources and faces practical problems. For example, it is needed to design an ad-hoc solution for each retrofit intervention and to know very well the specific dimensions and functionalities of the original circuit breaker and/or related panel, including possible variations over a long time span that may affect functionality and safety.

Hence, the present disclosure is aimed at providing a retrofit solution which allows overcoming at least some of the above mentioned shortcomings.

In particular, the present invention is aimed at providing a simple and effective retrofit solution which allows replacement of an existing circuit in a vertical panel with a new circuit breaker having horizontal connection contacts.

Thus, the present invention therefore relates to a retrofitting device for medium voltage panels. The retrofitting device of the invention comprises a plurality of first horizontal Circuit Breaker (CB) contacts aligned in a first horizontal plane, a plurality of second horizontal CB contacts aligned in a second horizontal plane spaced apart from said first horizontal plane, a plurality of first vertical SwitchGear panel (SWG) contacts aligned in a first vertical plane, a plurality of second vertical SWG contacts aligned in a second vertical plane spaced apart from said first vertical plane, a first bar assembly comprising first connection elements for connecting each of said first horizontal CB contacts with a corresponding first vertical SWG contact, a second bar assembly comprising second connection elements for connecting each of said second horizontal CB contacts with a corresponding second vertical SWG contact, said first connection elements comprising a first portion and a second portion linked to each other and free to change the angular position with respect to each other in a vertical plane when in an unlocked condition, said second connection elements comprising a third portion and a fourth portion linked to each other and free to change the angular position with respect to each other in a vertical plane when in an unlocked condition, first locking means being provided to lock the first with second portions and the third with the fourth portions in a desired position in which said first horizontal CB contacts and said second horizontal CB contacts are positioned on a substantially same vertical plane.

For the purposes of the present invention, the relative terms used in this disclosure, e.g. "upper", "lower", "forward", "back", as well as the terms "vertical" and "horizontal" relate to the retrofitting device and panel configurations under operation conditions. Moreover, the terms "horizontal contact" and "vertical contact" relate to the direction along which two corresponding contacts, namely a Circuit Breaker (CB) contact of the retrofitting device with a corresponding (input or output) contact of the new circuit breaker and a SwitchGear panel (SWG) contact of the retrofitting device with a corresponding (line or load) contact piece of the existing panel, are inserted into each other.

As better explained in the following description, thanks to the particular structure and functionality of the retrofitting device of the present invention it is possible not only to compensate for the different distances between the pre-existing contact pieces of the electric circuit in the panel and those of the corresponding input and output connection contacts of the circuit breaker, but also to transform the pre-existing vertical contact terminals of the panel into more conventional and standard horizontal contacts, mirroring the contacts layout of the replacement circuit breaker.

In practice, with the retrofitting device of the present invention, the contact points between the circuit breaker and the electric circuit in the panel are brought from the top of the circuit breaker compartment into an intermediate position in said compartment, with a first set of contacts lying in a first horizontal plane and a second set of contacts lying in a second horizontal plane, the first and second set of contacts being moreover aligned on the same vertical plane. Moreover, the possibility to change the respective angular position of the various portions of the connection elements of the retrofitting device allows a proper spacing among the contacts of each first and second set of contacts, so that the spatial positioning of the first and second set of contacts of the retrofitting device fully matches the spatial positioning of the input and output connection contacts of the new circuit breaker. Once the desired position is reached, the first locking means lock the various adjustable portions of the connection elements and the new circuit breaker can be easily plugged into the CB contacts of the retrofitting device.

Therefore, by installing the retrofitting device of the invention in the circuit breaker compartment of an existing vertical panel, it is possible to install in said panel a standard circuit breaker with horizontal contacts in a very quick and easy manner.

Advantageously, in the unlocked condition, said first portions and said second portions of the first connection elements, as well as said third portions and said fourth portions of the second connection elements, are free not only to rotate with respect to each other, but also to move vertically to a certain extent with respect to each other, thereby compensating for possible vertical misalignment among the first horizontal CB contacts; similarly said third portions and said fourth portions of the second connection elements are also free to move vertically to a certain extent with respect to each other, thereby compensating for possible vertical misalignment among the second horizontal CB contacts.

In a preferred embodiment of the retrofitting device of the present invention, said fourth portions of said second connection elements are L shaped with a vertical arm linked to the corresponding third portion and a horizontal arm protruding in the direction of said first bar assembly. The vertical arm can be a straight bar, or a bar having an inclined portion connecting two straight vertical portions.

In practice, with reference to a front view of the retrofitting device, said first bar assembly is in a forward vertical plane with respect to said second bar assembly, and the second horizontal plane of said second horizontal CB contacts is at a lower level with respect to the first horizontal plane of said first horizontal CB contacts.

As previously said, the various portions of the connection elements of the retrofitting device are provided with adjustable connections among each other that can be locked when the horizontal CB contacts are in the desired position.

For instance, in a possible embodiment of the retrofitting device of the present invention, any one of said first portion and second portion and any one of said third portion and fourth portion is provided with at least a slot, the remaining one of said first portion and second portion and the remaining one of said third portion and fourth portion is provided with at least a through hole. A first pin is then inserted into said slot and through hole and the first locking means lock rotation and/or translation of said first portion and second portion, and of said third portion and fourth portion with respect to said first pin, when the horizontal CB contacts are in the desired position. The first locking means can be, for example, screw means; other equivalent means are also possible.

Preferably, said second bar assembly comprises third connection elements which are linked to the horizontal arm of the fourth portions of a corresponding second connection element; said third connection elements are free to move in a horizontal plane with respect to said second connection element when in an unlocked condition, second locking means being provided to lock the third connection elements with the corresponding second connection elements.

In such a case, said third connection elements are L shaped and have a horizontal arm linked to the fourth portion of the corresponding second connection elements and a vertical arm supporting a corresponding second horizontal CB contact.

Thus, according to this embodiment, the retrofitting device of the present invention is provided with further connection elements, e.g. an angular element having a supporting arm for a horizontal CB contact and a connection arm for connection with the second connection element, adjustably connected to the second connection elements. The third connection elements can then be locked by the second locking means when the horizontal CB contacts are in the desired position. In this way it is possible to have a further position regulation among the horizontal CB contacts, compensating for minor misalignment and allowing a more precise positioning of the horizontal CB contacts.

For instance, in such an embodiment, any one of said third connection elements and horizontal arm of the fourth portion is provided with at least a slot, and the remaining one of said third connection elements and horizontal arm of the fourth portion is provided with at least a through hole. A third pin is inserted into said slot and through hole, and said second locking means lock rotation and/or translation of said third connection elements and horizontal arm of the fourth portion with respect to said third pin, when the horizontal CB contacts are in the desired position. Also in this case, the second locking means can be, for example, screw means, other equivalent means being possible.

Conveniently, the retrofitting device according to the present invention, characterized can be provided with a plurality of spacing insulator which connect said second portion of the first connection elements with a corresponding fourth portion of the second connection elements. Said spacing insulators help maintaining a correct distance between the first and the second bar assembly, as well as supporting and imparting stiffness to the bar assemblies of the retrofitting device.

Preferably, the retrofitting device of the disclosure, is also provided with a basement having an adjustable frame. A plurality of supporting insulator are positioned on the adjustable frame, each of said supporting insulator being connected to a corresponding second connection element of said second bar assembly. Such basement, thanks to the possibility of regulating e.g. the height of the adjustable frame, allows a perfect fitting of the retrofitting device inside the circuit breaker compartment of an existing panel.

Depending on the needs and on the rated voltage of the installation, the retrofitting device of the invention can conveniently comprise insulating pipes, e.g. finned pipes or smooth pipes, positioned around at least a portion of said first and/or second connection elements.

Also, insulating protections positioned at least in correspondence of each of said first and second horizontal CB contacts can also be provided, as well as further insulation partitions or screens.

Further features and advantages of the present invention will be more clear from the description of preferred but not exclusive embodiments of a retrofitting device for medium voltage panels according to the invention, particularly for medium voltage vertical lift panels, shown by way of examples in the accompanying drawings, wherein:

FIG. 9 is an exploded view of a possible embodiment of a second connection element of a retrofitting device according to the invention;

FIG. 10 shows some details of a possible embodiment of third connection elements of a retrofitting device according to the invention;

FIG. 11 is a perspective view of a second general embodiment of a retrofitting device according to the invention;

FIG. 18 is an exploded view of a medium voltage panel comprising a retrofitting device according to the invention.

Figure 1:
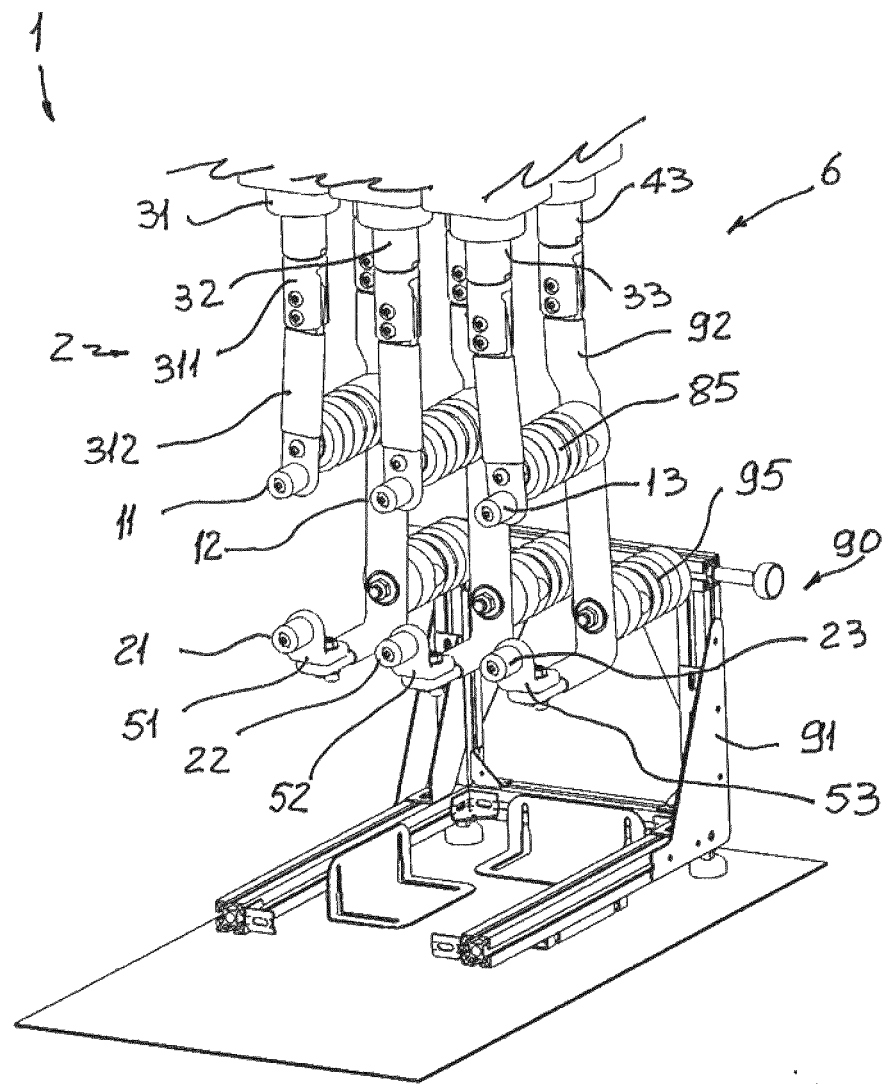
FIG. 1 is a perspective view of a first general embodiment of a retrofitting device according to the invention.
Figure 2:
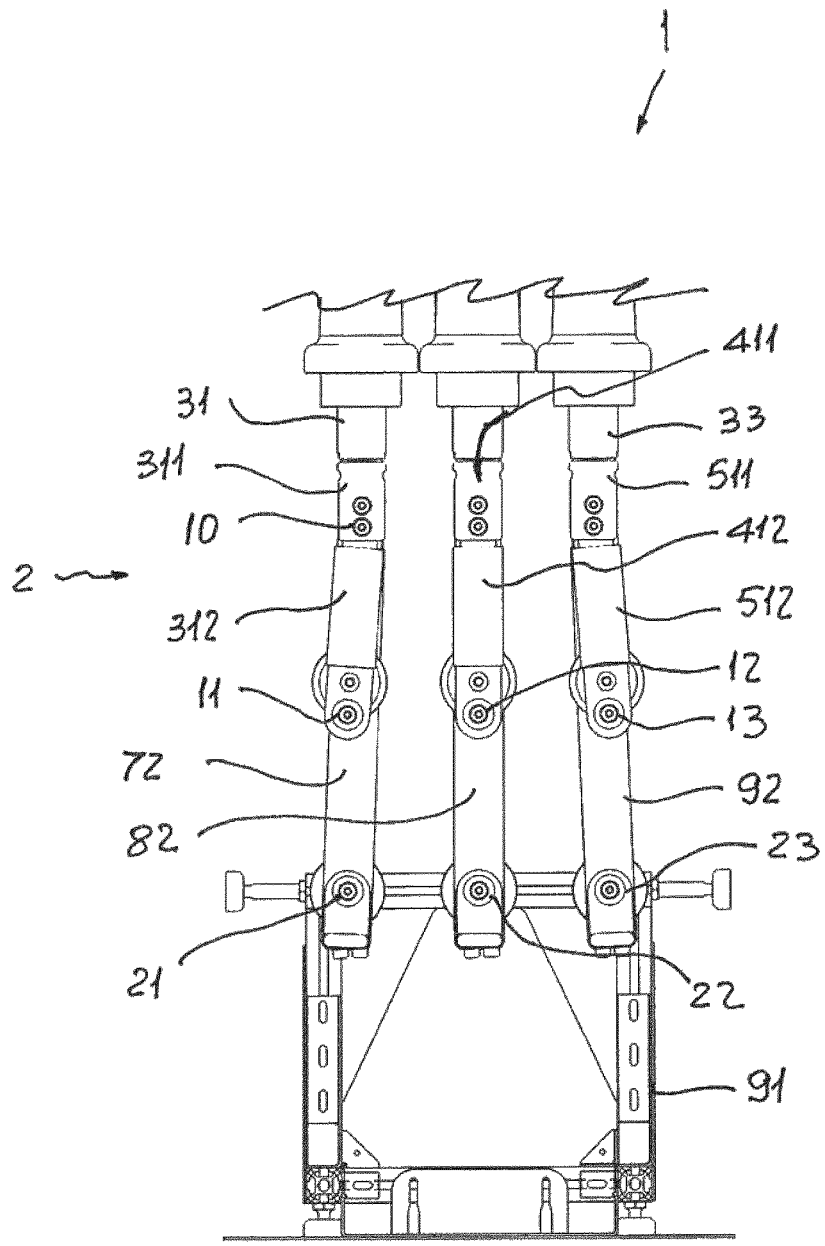
FIG. 2 is a front view of the retrofitting device of FIG. 1.

With reference to the attached figures, according to the present invention, a retrofitting device for medium voltage panels 100, generally designated with the reference numeral 1, comprises in its more general definition a plurality of first horizontal CB contacts 11, 12, 13 which are aligned in a first horizontal plane, as well as a plurality of second horizontal CB contacts 21, 22, 23 which are aligned in a second horizontal plane spaced apart from said first horizontal plane. The vertical distance between the first and second horizontal planes substantially corresponds to the vertical distance between the input and output contacts of the replacement circuit breaker 102.

The retrofitting device 1 also comprises a plurality of first vertical SWG contacts 31, 32, 33 which are aligned in a first vertical plane, and plurality of second vertical SWG contacts 41, 42, 43 which are aligned in a second vertical plane spaced apart from said first vertical plane. The spatial positioning of the first and second vertical SWG contacts matches the spatial positioning of the line and load contact pieces 200 of the panel 100, the horizontal distance between the first and second vertical planes substantially corresponding to the horizontal distance between the line and load contacts 200 of the panel 100.

The connection between the first horizontal CB contacts 11, 12, 13 and the first vertical SWG contacts 31, 32, 33 is carried out by a first, forward, bar assembly 2, while the connection between the second horizontal CB contacts 21, 22, 23 and the second vertical SWG contact 41, 42, 43 is carried out by a second, back, bar assembly 6.

In particular, the first bar assembly 2 comprises first connection elements 3, 4, 5 for connecting each of said first horizontal CB contacts 11, 12, 13 with a corresponding first vertical SWG contact 31, 32, 33, while the second bar assembly 6 comprises second connection elements 7, 8, 9 for connecting each of said second horizontal CB contacts 21, 22, 23 with a corresponding second vertical SWG contact 41, 42, 43.

The bar assemblies 2, 6, and in particular the first 3, 4, 5 and second 7, 8, 9 connection elements are rigid elements, such as flat bars or rounded bars or similar electrical connection elements.

One of the distinctive feature of the retrofitting device 1 of the present invention is given by the fact that said first connection elements 3, 4, 5 comprise a first portion 311, 411, 511 adjustably linked to a corresponding second portion 312, 412, 512, so that said first and second portions are free to rotate and change the angular position with respect to each other in a vertical plane when in an unlocked condition. Similarly, said second connection elements 7, 8, 9 comprise a third portion 71, 81, 91 adjustably linked to a corresponding fourth portion 72, 82, 92, so that said third and fourth portions are free to rotate and change the angular position with respect to each other in a vertical plane when in an unlocked condition.

Figure 3:
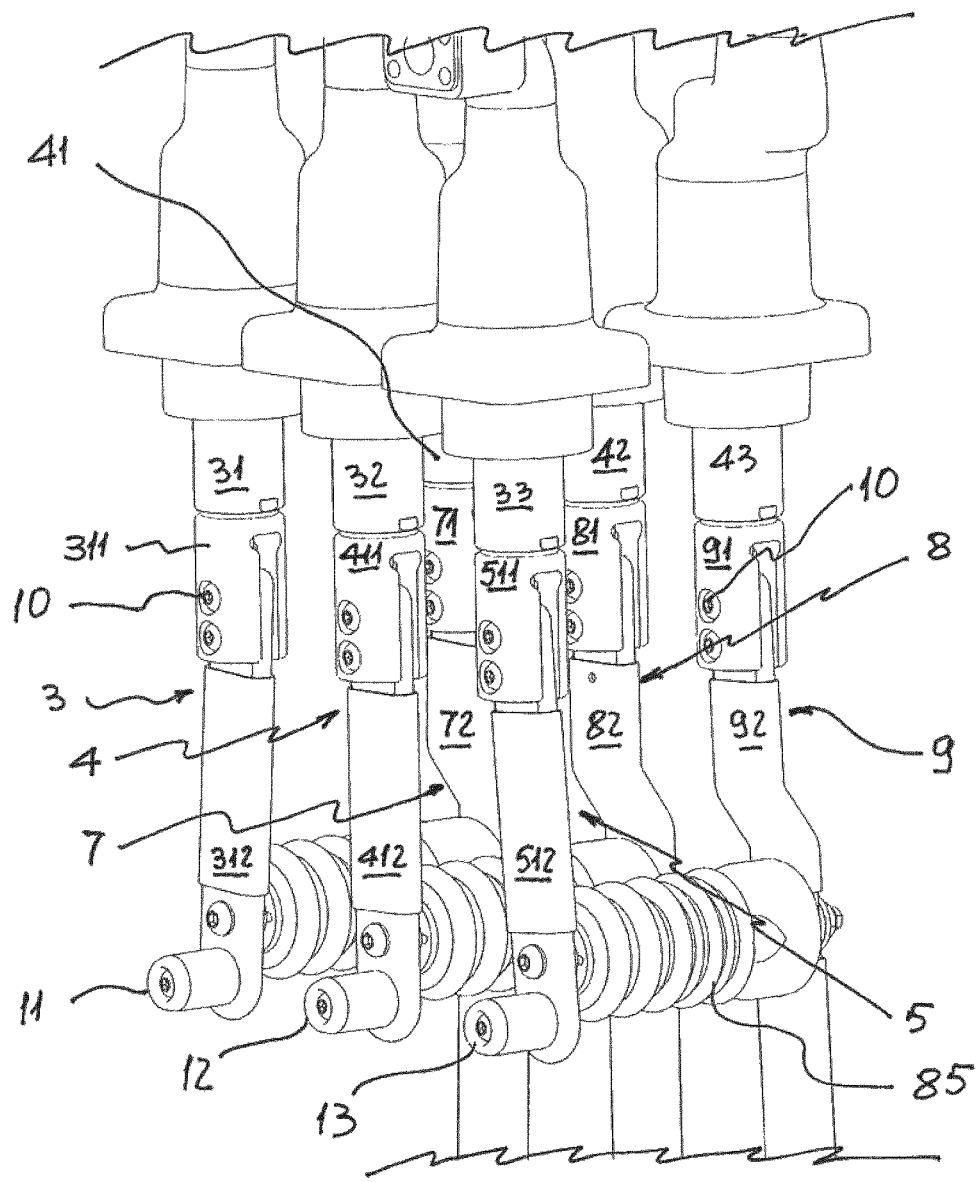
FIG. 3 shows some details of the retrofitting device of FIG. 1.

In practice, as particularly clear from the front views given in FIGS. 2, 4, 5 and 6, the various adjustable portions of the first 3, 4, 5 and second 7, 8, 9 connection elements can rotate in a vertical plane with respect to each other so that the horizontal distance among the first horizontal CB contacts 11, 12, 13 is different from the horizontal distance among the first vertical SWG contact 31, 32, 33. For instance, with reference to FIGS. 2, 3 and 6, the second portion 312 of the first connection element 3 is rotated clockwise with respect to the first portion 311 by an angle α, while the second portion 512 of the connection element 5 is rotated counterclockwise with respect to the first portion 511 by an angle β, equal to or different from the angle α, the first 411 and second 412 portions of the connection element 4 being kept substantially aligned. As a result, the horizontal distance among the first horizontal CB contacts 11, 12, 13 is greater than the horizontal distance among the first vertical SWG contact 31, 32, 33.

This design feature enable to adapt from original SWG horizontal distance among the first vertical SWG contact 31, 32, 33 to required horizontal distance among the first horizontal CB contacts 11, 12, 13 so to accept a standard production CB with a defined horizontal distance. Similarly, with reference to FIGS. 2, 4 and 5, the second portion 72 of the second connection element 7 is rotated clockwise with respect to the first portion 71 by an angle γ, while the second portion 92 of the connection element 9 is rotated counterclockwise with respect to the first portion 91 by an angle δ, equal to or different from the angle γ, the first 81 and second 82 portions of the connection element 8 being kept substantially aligned. As a result, the horizontal distance among the second horizontal CB contacts 21, 22, 23 is greater than the horizontal distance among the second vertical SWG contact 41, 42, 43.

The angles α, β, γ, and δ can be equal to or different from each other. Normally, the horizontal distance among the first horizontal CB contacts 11, 12, 13 is the same as the horizontal distance among the second horizontal CB contacts 21, 22, 23, and is also the same as the horizontal distance between the input and output contacts of the replacement circuit breaker 102.

Once the proper, desired, positioning of the first 11, 12, 13 and second 21, 22, 23 horizontal CB contacts has been reached, first locking means 10 lock the first portions 311, 411, 511 with the corresponding second portions 312, 412, 512, as well as the third portions 71, 81, 91 with the corresponding fourth portions 72, 82, 92. Some details on the adjustable connections between the various portions of the connection elements, as well as on the first locking means 10, will be given hereafter.

Figure 7:
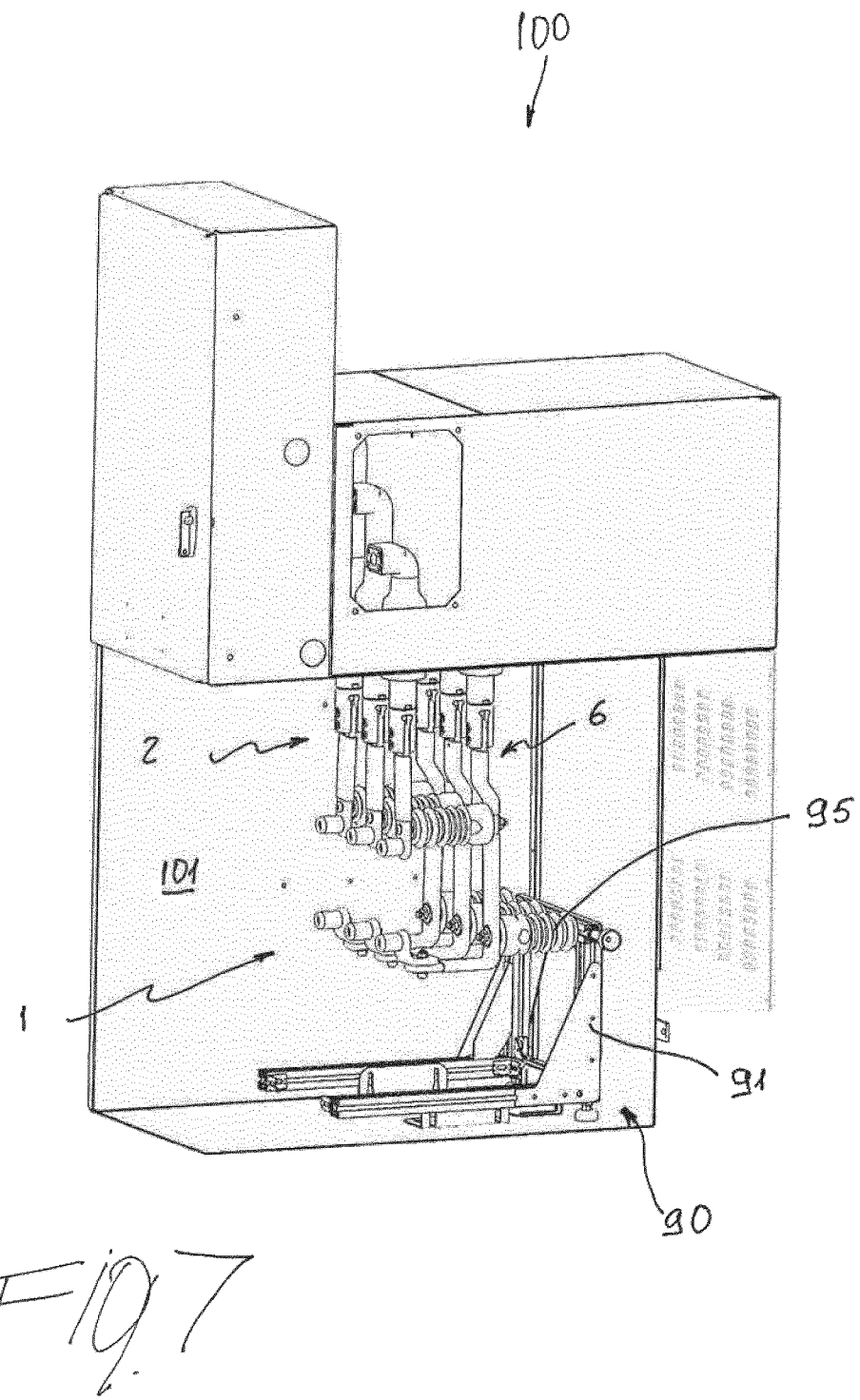
FIG. 7 is a perspective view of the retrofitting device of FIG. 1 installed into a panel.
Figure 12:
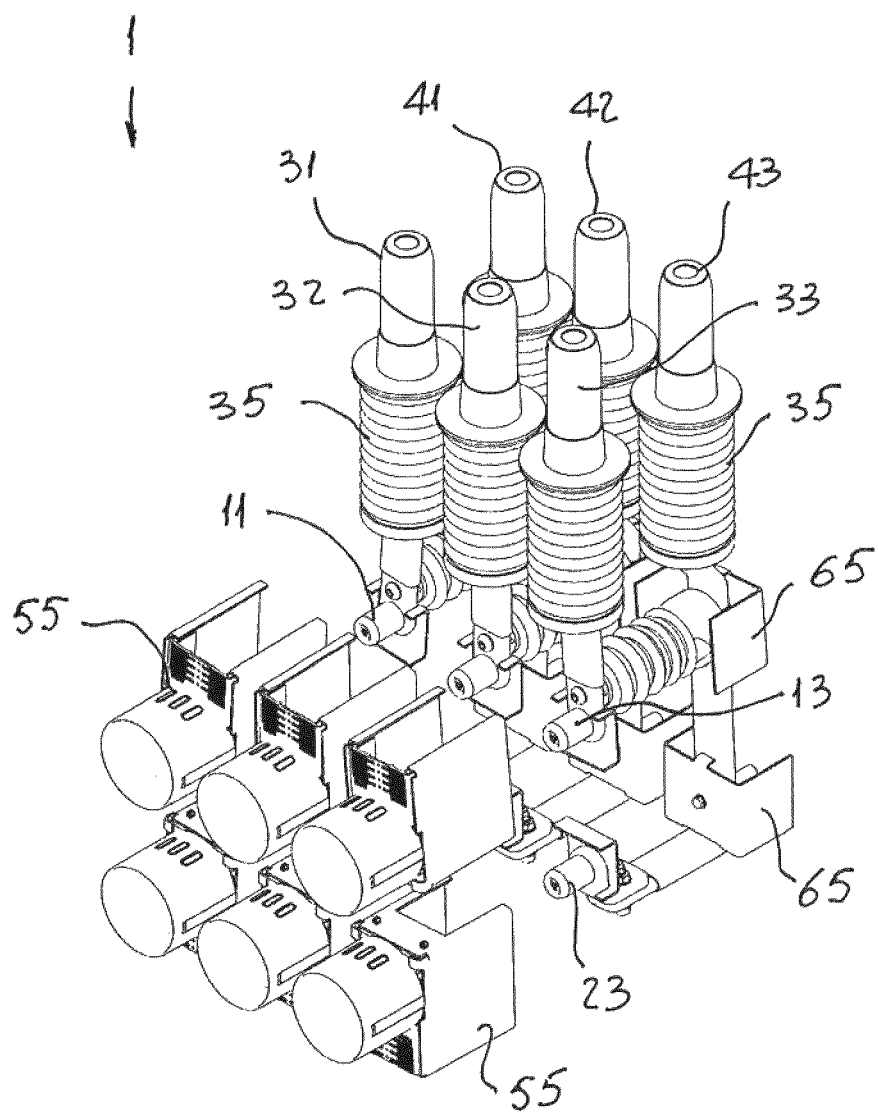
FIG. 12 is an exploded view of the retrofitting device of FIG. 11.
Figure 13:
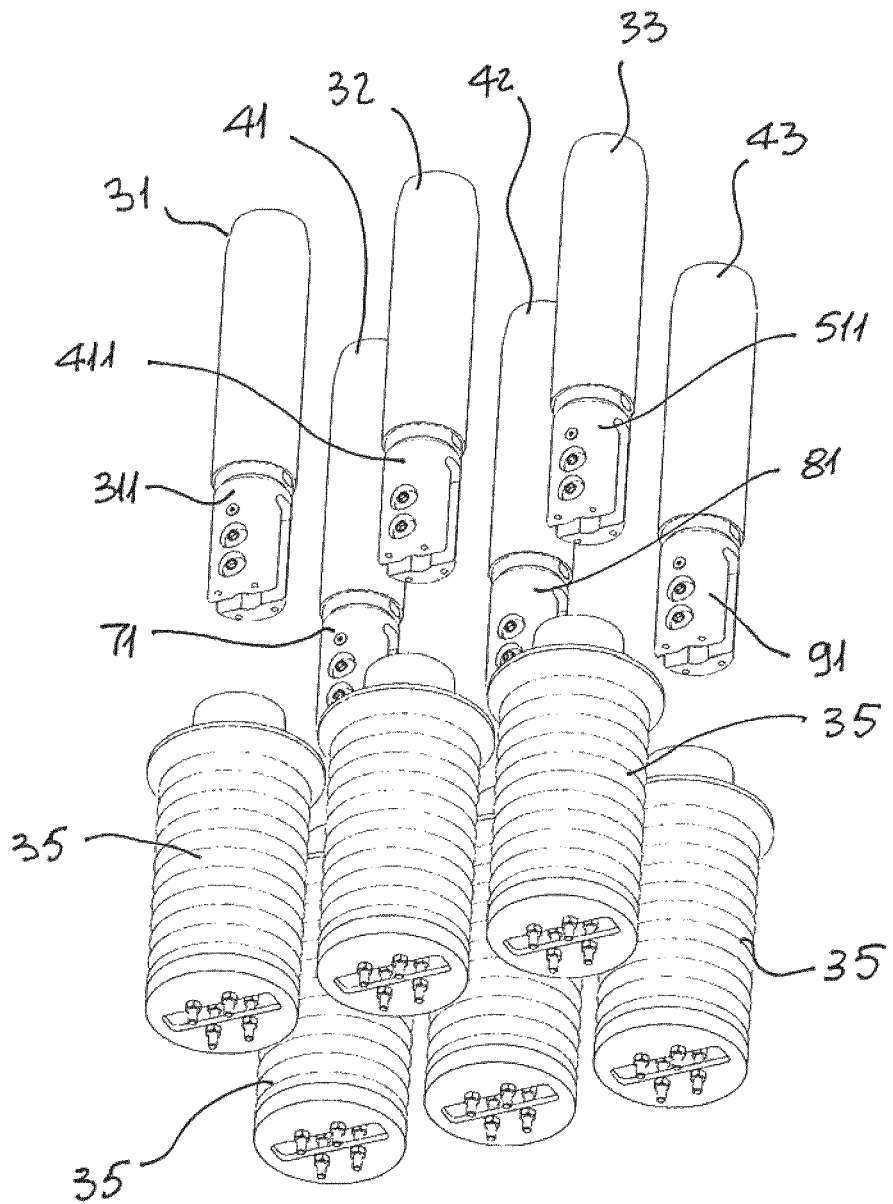
FIG. 13 is an exploded view showing some details of the retrofitting device of FIG. 11.
Figure 14:
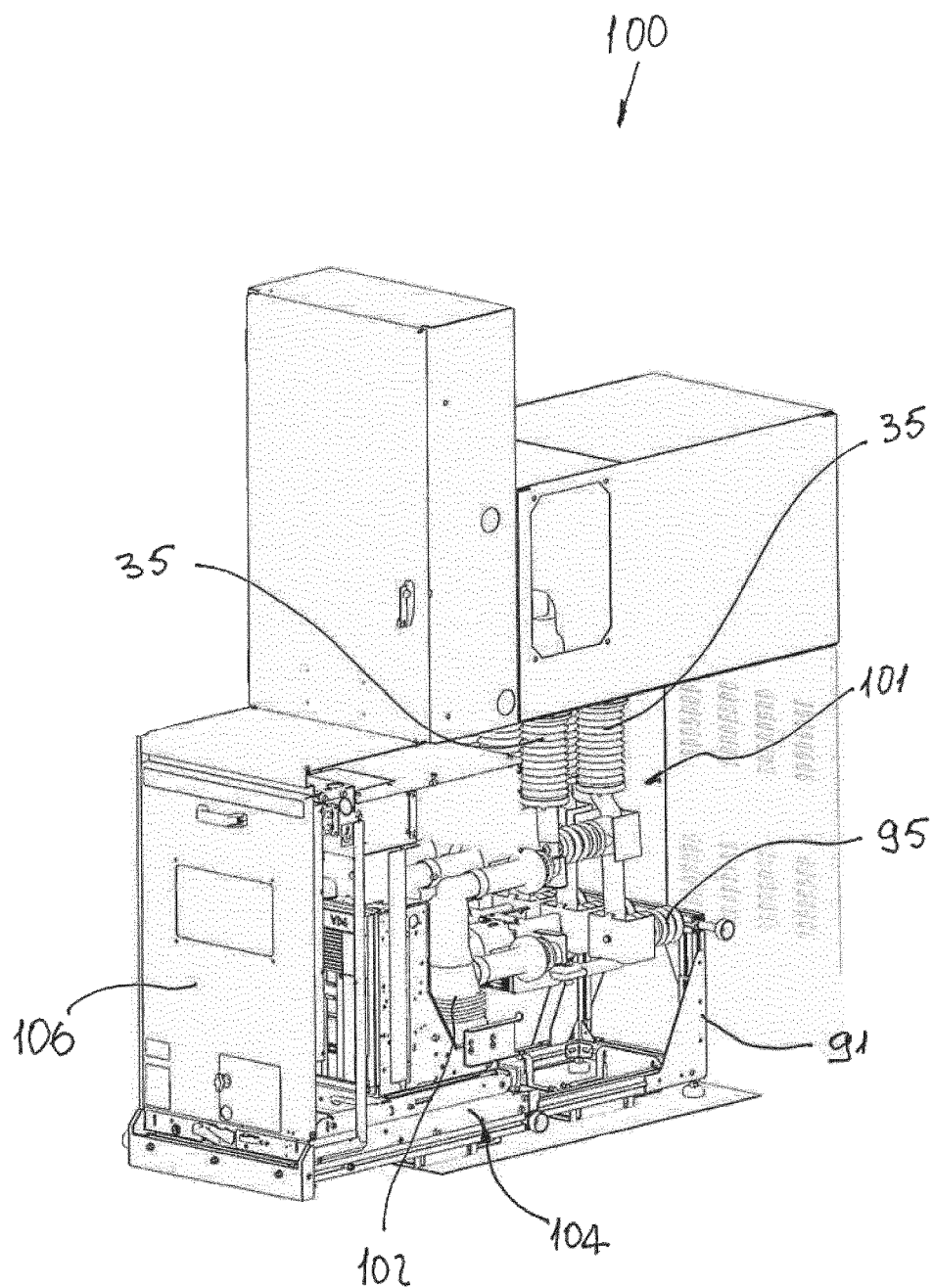
FIG. 14 is a perspective view of the retrofitting device of FIG. 11 installed into a panel.

In the final position, as clearly represented e.g. in FIGS. 1, 7 and 12, the first horizontal CB contacts 11, 12, 13 and the second horizontal CB contacts 21, 22, 23 are positioned on a substantially same vertical plane, thereby allowing an easy plug-in connection of the new circuit breaker which normally has the input and output contacts also positioned on a substantially same vertical plane.

In a particular embodiment of the retrofitting device 1 of this invention, the first portions 311, 411, 511 are also free to move linearly in a vertical direction with respect to said second 312, 412, 512 portions, and the third portions 71, 81, 91 are also free to move linearly in a vertical direction with respect to said fourth portions 72, 82, 92, when in an unlocked condition. In this way, it is possible to adjust in a more precise manner the horizontal alignment of the first 11, 12, 13 and second 21, 22, 23 horizontal CB contacts in the corresponding first and second horizontal planes.

As more clearly shown in FIGS. 7, 9 and 10, the fourth portions 72, 82, 92 of said second connection elements 7, 8, 9 are L shaped with a vertical arm 721, 821, 921 which is adjustably linked to the corresponding third portion 71, 81, 91 of the second connection elements 7, 8, 9, and a horizontal arm 722, 822, 922 which extends forwardly in the direction of said first bar assembly 2. In this way, the panel contact points lying in a back vertical plane at the top of the circuit breaker compartment 101 are brought on a lower horizontal plane inside said circuit breaker compartment 101.

In practice with reference to a front view of the retrofitting device 1 and panel 100, said first bar assembly 2 is in a forward vertical plane with respect to said second bar assembly 6, and the second horizontal plane of said second horizontal CB contacts 21, 22, 23 is at a lower level with respect to the first horizontal plane of said first horizontal CB contacts 11, 12, 13. In a particularly preferred embodiment of the retrofitting device 1 according to the present invention, illustrated on details in FIGS. 9 and 10, the second bar assembly 6 comprises third connection elements 51, 52, 53 which are linked to the horizontal arm 722, 822, 922 of the fourth portions 72, 82, 92 of a corresponding second connection element 7, 8, 9. Said third connection elements 51, 52, 53 are free to move in a horizontal plane with respect to said second connection element 7, 8, 9 when in an unlocked condition, so as to achieve proper positioning of the second horizontal CB contact 21, 22, 23. Second locking means 20 are also provided to lock the third connection elements 51, 52, 53 with the corresponding second connection elements 7, 8, 9, once the second horizontal CB contact 21, 22, 23 are in the desired position.

Preferably, said third connection elements 51, 52, 53 are L shaped with a horizontal arm 511, 521, 531 which is linked to the fourth portion 72, 82, 92 of the corresponding second connection elements 7, 8, 9 and a vertical arm 512, 522, 532 which is used to support a corresponding second horizontal CB contact 21, 22, 23.

With reference to FIGS. 4, 5, 6, 8 and 9, said the second portions 312, 412, 512 and said fourth portions 72, 82, 92 are preferably flat bars which are respectively clamped into a terminal end of the first portions 311, 411, 511 and third portions 71, 81, 91.

The connections between the respective various portions can be achieved by using adjustable connection means.

For instance, any one of said first portions 311, 411, 511 and second portions 312, 412, 512 and any one of said third portions 71, 81, 91 and fourth portions 72, 82, 92 is provided with at least a slot 30, while the remaining one of said first portion 311, 411, 511 and second portion 312, 412, 512 and the remaining one of said third portion 71, 81, 91 and fourth portion 72, 82, 92 is provided with at least a through hole 40.

Figure 4:
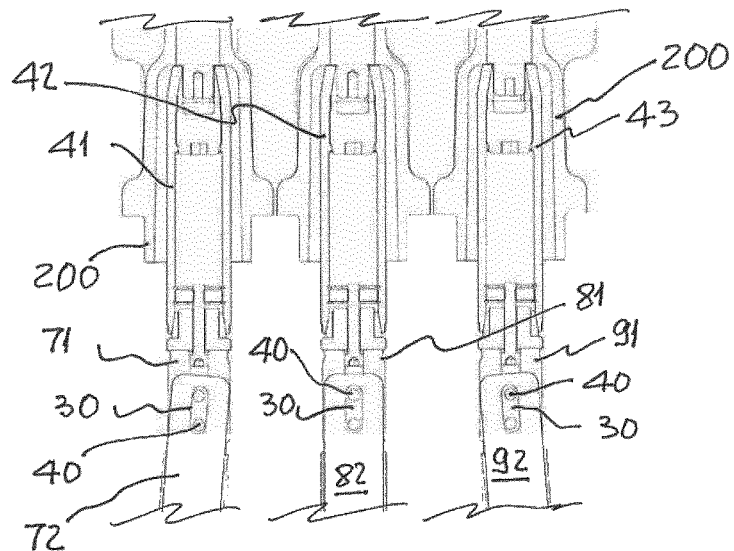
FIG. 4 shows a first embodiment of the connection elements of a retrofitting device according to the invention.
Figure 5:
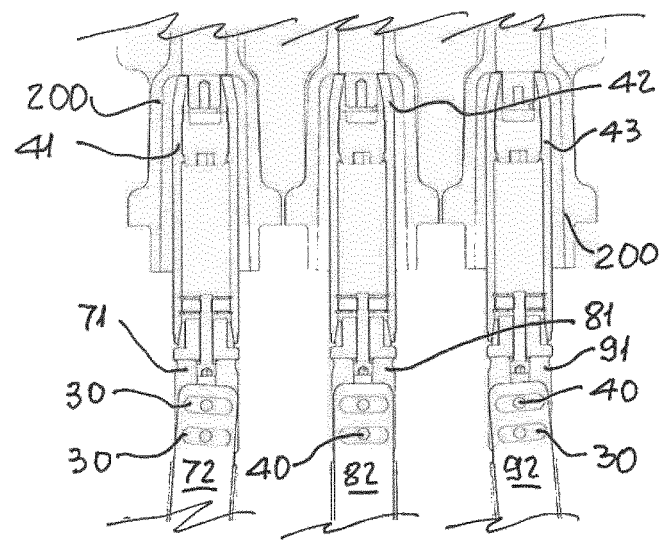
FIG. 5 shows a second embodiment of the connection elements of a retrofitting device according to the invention.
Figure 8:
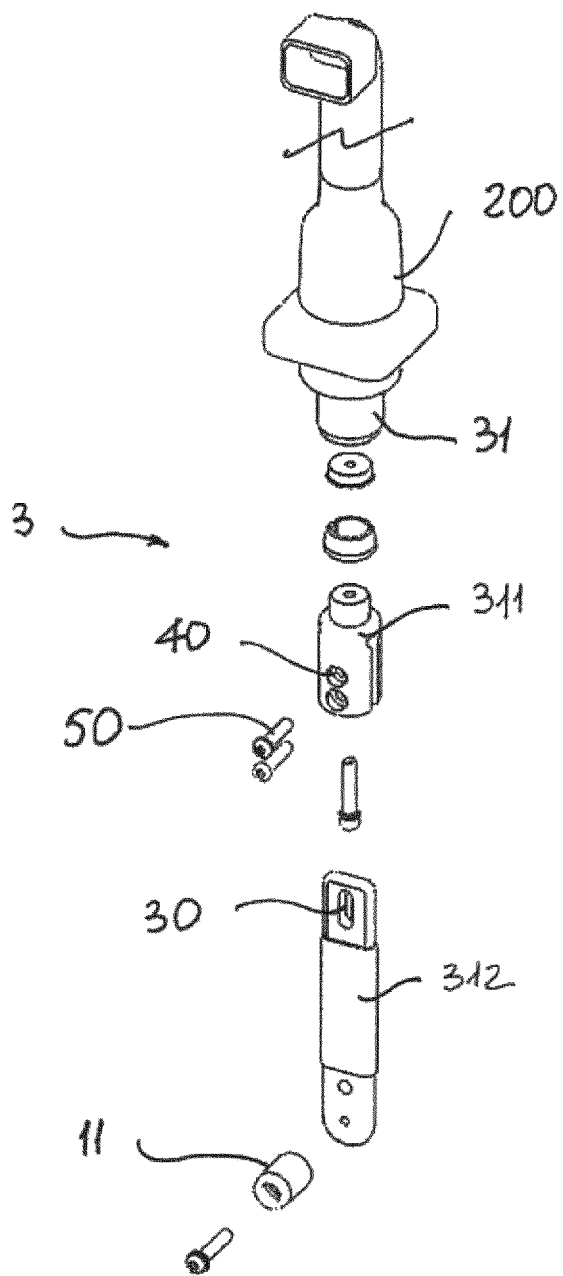
FIG. 8 is an exploded view of a possible embodiment of a first connection element of a retrofitting device according to the invention.

For instance, with reference to FIGS. 4, 8, and 9, the second portions 312, 412, 512 and the fourth portions 72, 82, 92 are each provided with a vertically extended slot 30, while each of said first portions 311, 411, 511 and third portions 71, 81, 91 is provided with a pair of through holes 40. The flat terminal ends of the second 312, 412, 512 and fourth 72, 82, 92 portions, with the corresponding slots 30, are clamped into the terminal ends of the first portions 311, 411, 511 and third portions 71, 81, 91, with the through holes 40 superimposed to the slots 30.

A pair of first pins 50 is then inserted into the through holes 40 and the slots 30. The diameter of the pins 50 is slightly lower than the width of the slots 30, so as to allow free rotation in a vertical plane of the first portions 311, 411, 511 with respect to the second 312, 412, 512 portion, as well as of the third portions 71, 81, 91 with respect to the fourth portions 72, 82, 92.

Possibly, the diameter of the pins 50 is also slightly lower than the diameter of the through holes 40, so as to allow linear movement of the first portions 311, 411, 511 with respect to the second 312, 412, 512 portion, as well as of the third portions 71, 81, 91 with respect to the fourth portions 72, 82, 92.

In general, the length and width of the slots, as well as the diameters of the trough holes and pins can be selected so as to allow a desired freedom of movements among the various parts. Alternatively, with reference to FIG. 5, the second portions 312, 412, 512 and the fourth portions 72, 82, 92 are each provided with a pair of horizontally extended slots 30, so that, once the second 312, 412, 512 and fourth 72, 82, 92 portions are clamped into the terminal ends of the first portions 311, 411, 511 and third portions 71, 81, 91, the through holes 40 are superimposed to the slots 30. Then, a pair of pins is then inserted into the through holes 40 and slots 30 as previously described.

Figure 6:
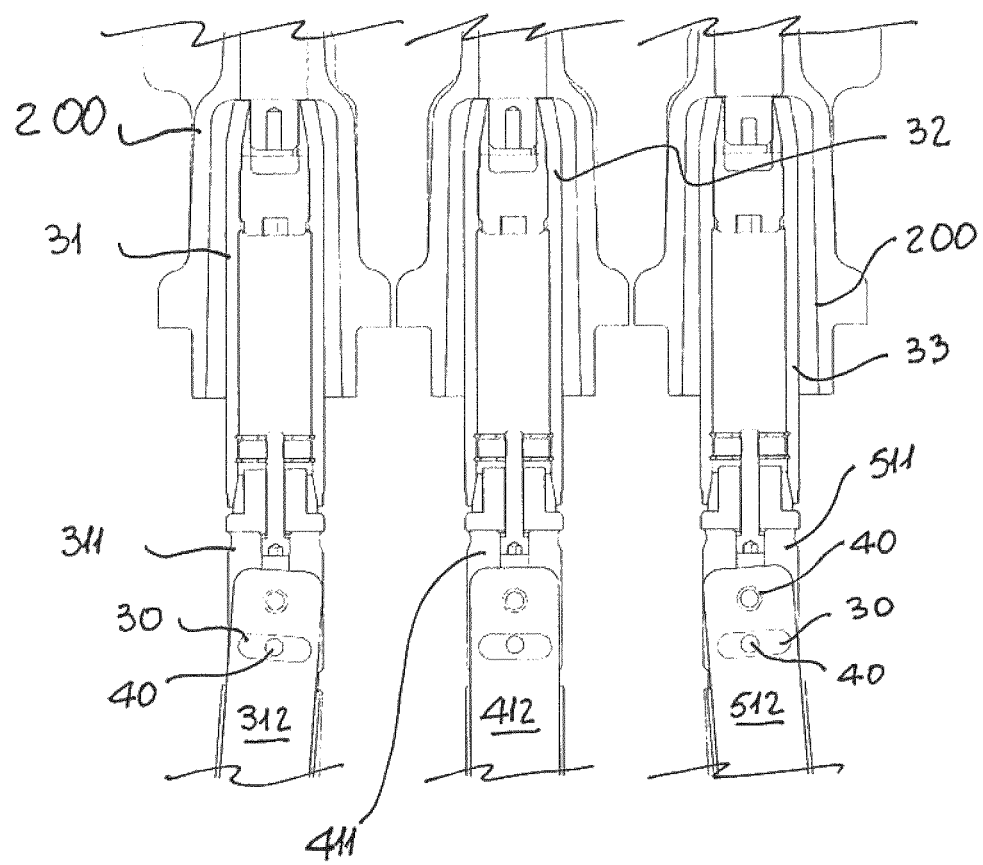
FIG. 6 shows a third embodiment of the connection elements of a retrofitting device according to the invention.

As a further alternative, with reference to FIG. 6, the second portions 312, 412, 512 and the fourth portions 72, 82, 92 are each provided with a horizontally extended slot 30 and with a through hole, so that, once the second 312, 412, 512 and fourth 72, 82, 92 portions are clamped into the terminal ends of the first portions 311, 411, 511 and third portions 71, 81, 91, the through holes 40 of the first 311, 411, 511 and third 71, 81, 91 portions are superimposed to the horizontal slots 30 and through hole of the second 312, 412,

512 and the fourth 72, 82, 92 portions. Then, a pair of pins is then inserted into the through holes 40 and slots 30 as previously described.

Once the pins 50 have been inserted, rotation and/or translation of said first portion 311, 411, 511 and second portion 312, 412, 512, and of said third portion 71, 81, 91 and fourth portion 72, 82, 92 with respect to said first pin 50, as well as with respect to each other, can be locked by the first locking means 10. As an example, said first locking means 10 can conveniently comprise screw means to exert the locking action.

With reference to FIGS. 9 and 10, the third connection elements 51, 52, 53 can also be adjustably connected to the second connection elements 7, 8, 9.

In particular, in a preferred embodiment of the retrofitting device 1 of this disclosure, any one of said third connection elements 51, 52, 53 and horizontal arm 722, 822, 922 of the fourth portions 72, 82, 92 of the second connection elements 7, 8, 9 is provided with at least a slot 60, while the remaining one of said third connection elements 51, 52, 53 and horizontal arm 722, 822, 922 of the fourth portions 72, 82, 92 is provided with at least a through hole 70.

In particular, with reference to FIGS. 9 and 10, the horizontal arm 511, 521, 531 of the L shaped third connection elements 51, 52, 53 can be conveniently provided with a pair of slots 60 matching a corresponding pair of through holes 70 positioned on the horizontal arm 722, 822, 922 of the fourth portions 72, 82, 92 of the second connection elements 7, 8, 9.

A third pin 80 is then inserted into a corresponding slot 60 and through hole 70 allowing at least linear translation, forward and backward with respect to a front view, of the third connection elements 51, 52, 53 with respect to the second connection elements 7, 8, 9, thereby making possible the alignment in a vertical plane of the second horizontal CB contacts 21, 22, 23 with respect to each other and with respect to the first horizontal CB contacts 11, 12, 13. Once the pins 50 have been inserted, translation (and possibly also rotation), of said third connection elements 51, 52, 53 and horizontal arm 722, 822, 922 of the fourth portions 72, 82, 92 with respect to said third pin 80, as well as with respect to each other, can be locked by the second locking means 20. As an example, said second locking means 20 can conveniently comprise screw means to exert the locking action.

Also in this case, the length and width of the slots, as well as the diameters of the trough holes and pins can be selected so as to allow a desired freedom of movements among the various parts.

Preferably, in order to impart rigidity and stiffness to the overall assembly of the retrofitting device 1 according to the present invention, the first bar assembly 2 and the second bar assembly 6 can be rigidly connected to each other by using suitable supporting and spacing insulators 85.

In particular, the retrofitting device 1 of the present invention can conveniently comprise a plurality of spacing insulator 85 which connect said second portion 312, 412, 512 of the first connection elements 3, 4, 5 with a corresponding fourth portion 72, 82, 92 of the second connection elements 7, 8, 9.

The retrofitting device 1 of the present disclosure can moreover comprise a basement 90 having an adjustable frame 91. A plurality of supporting insulator 95 are preferably positioned on said adjustable frame 91, and each of them is connected to a corresponding second connection element 7, 8, 9 of said second bar assembly 6. As better explained hereafter, the basement 90 with adjustable frame 91 allows adapting the retrofitting device 1 inside the circuit breaker compartment 101 of a panel 100 in a perfect manner in a very easy and quick manner.

In order to guarantee electrical insulation among the various conductive elements, the retrofitting device 1 of the present invention can be conveniently provided with insulating pipes 35, 45 positioned around at least a portion of said first 3, 4, 5 and/or second 7, 8, 9 connection elements. Depending on the rated voltage, said insulating pipes 35, 45 can have different shapes and dimensions, and can include a compressible gasket, so as to provide tightness with respect to surface discharges and improve insulating levels.

With reference to FIGS. 11 to 14, said insulating pipes 35 can be finned pipes positioned around the first 3, 4, 5 and second 7, 8, 9 connection elements, just below the first 31, 32, 33 and second 41, 42, 43 vertical SWG contacts.

Figure 15:
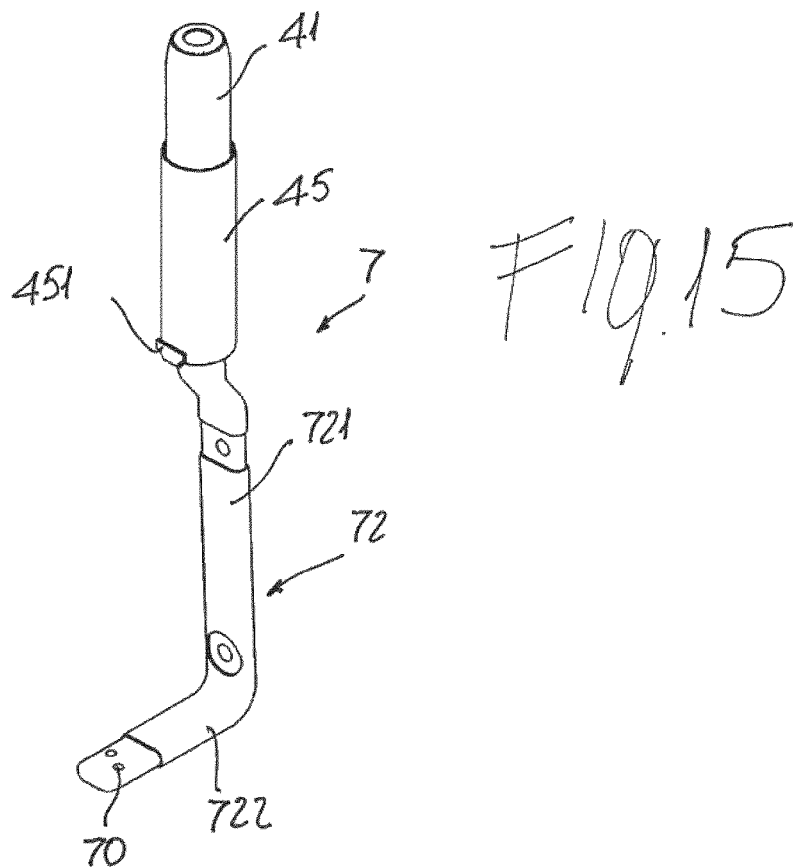
FIG. 15 is a perspective view of particular embodiment of a connection element of a retrofitting device according to the invention.
Figure 16:
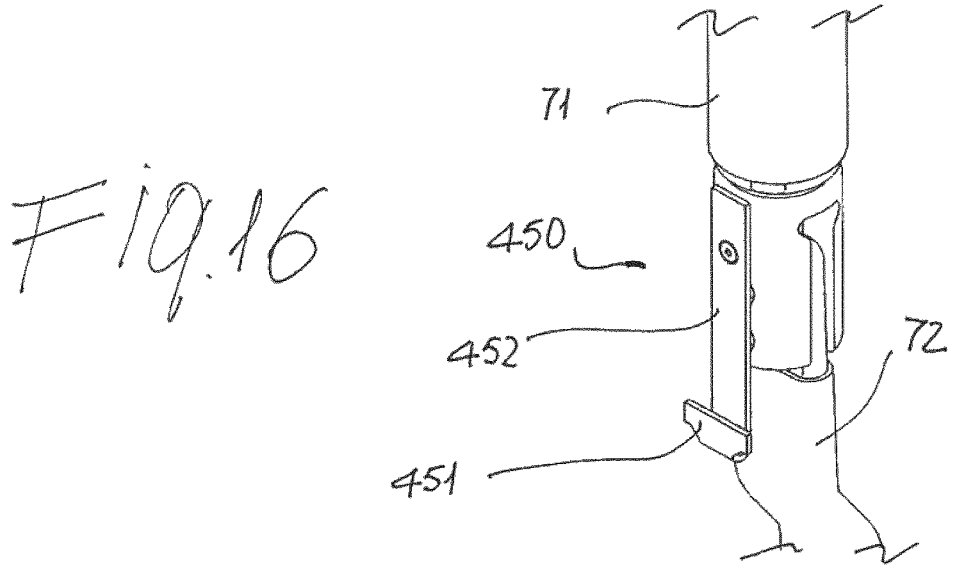
FIG. 16 shows some details of the embodiment of FIG. 15.
Figure 17:
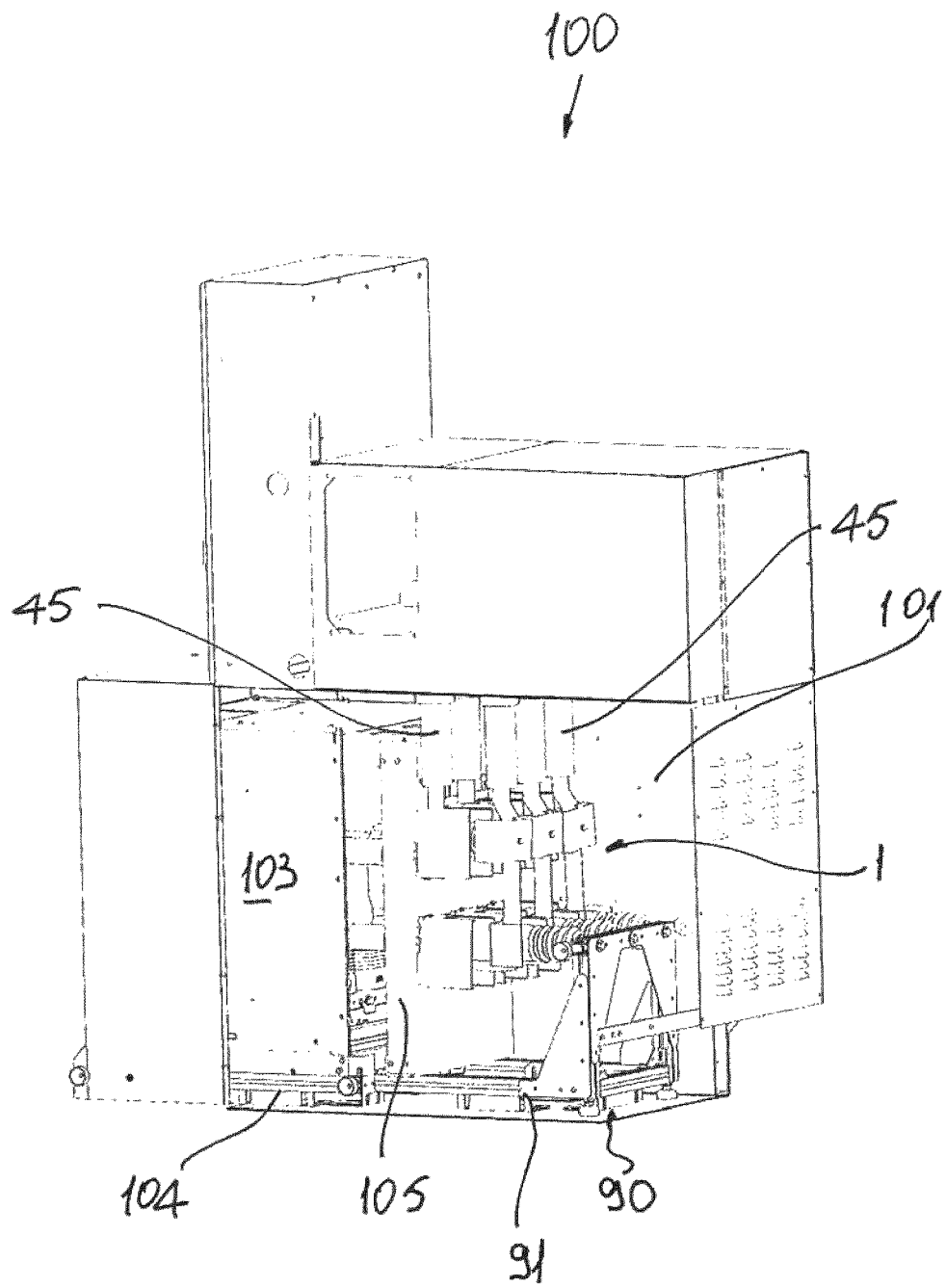
FIG. 17 is a perspective view of a retrofitting device with the connection elements of FIG. 15 installed into a panel.

Alternatively, with reference to FIGS. 15, 16 and 17, said insulating pipes 45 can be smooth pipes, always positioned around the first 3, 4, 5 and second 7, 8, 9 connection elements, just below the first 31, 32, 33 and second 41, 42, 43 vertical SWG contacts. In this latter case, a supporting element 450 can be provided to support the pipe 45. The supporting element 450 can for instance comprise a flat bar positioned inside the pipe 45 and screwed, e.g., on the third portion 71, 81, 91 of the second connection elements 7, 8, 9, and a hooked portion 451 which engages the lower rim of the pipe 45.

Also, with particular reference to FIGS. 11 and 12, the retrofitting device 1 according of the present invention can be conveniently provided with insulating protections 55, which are positioned at least in correspondence of each of said first 11, 12, 13 and second 21, 22, 23 horizontal CB contacts.

With reference to FIG. 18, the retrofitting operation of a vertical medium voltage panel 100 with a new horizontal circuit breaker 102, which is normally a circuit breaker of the withdrawable type, can be easily carried out by using a retrofitting device 1 according to the present invention.

The replacement circuit breaker 102 is normally housed in an adjustable frame 103 with corresponding basement 104. The adjustable frame and basement of the circuit breaker 102 allow an optimal positioning of the circuit breaker 102 inside the circuit breaker compartment 101 of the panel 100. A door 106 can be provided for closing the front wall of the frame 103. Also an insulating plate 105 can be positioned between the circuit breaker frame and the retrofitting device 1.

The retrofitting device 1 according to the present invention can be perfectly adapted to the internal space of the circuit breaker compartment 101 of the panel 100 thanks to the adjustable frame 91 of its basement 90. As previously described, the layout of the first horizontal CB contacts 11, 12, 13 and of the second horizontal CB contacts 21, 22, 23 can be adjusted by rotating and/or translating the adjustable first 311, 411, 511, second 312, 412, 512, third 71, 81, 91 and 72, 82, 92 portions of the first 3, 4, 5 and second 7, 8, 9 connection elements, so that said first and second horizontal CB contacts perfectly mirrors the layout of the input and output connection contacts of the circuit breaker 102.

As is clear from the above description, the technical solutions adopted for the retrofitting device according to the present invention allow the proposed aims and the objects to be fully achieved.

The retrofitting device according to the invention can be easily mounted inside the circuit breaker compartment of an existing vertical lift panel, transforming its vertical connection points into horizontal connection points matching the contact points of a standard circuit breaker.

Several variations can be made to the retrofitting device thus conceived, all falling within the scope of the attached claims. In practice, the materials used and the contingent dimensions and shapes can be any, according to requirements and to the state of the art.

The invention claimed is:

1. A retrofitting device for medium voltage panels, comprising:
   a plurality of first horizontal CB contacts aligned in a first horizontal plane,
   a plurality of second horizontal CB contacts aligned in a second horizontal plane spaced apart from said first horizontal plane,
   a plurality of first vertical SWG contacts aligned in a first vertical plane,
   a plurality of second vertical SWG contacts aligned in a second vertical plane spaced apart from said first vertical plane,
   a first bar assembly comprising first connection elements for connecting each of said first horizontal CB contacts with a corresponding first vertical SWG contact,
   a second bar assembly comprising second connection elements for connecting each of said second horizontal CB contacts with a corresponding second vertical SWG contact,
   wherein said first connection elements comprises a first portion and a second portion linked to each other and free to change the angular position with respect to each other in a vertical plane when in an unlocked condition,
   wherein said second connection elements comprises a third portion and a fourth portion linked to each other and free to change the angular position with respect to each other in a vertical plane when in an unlocked condition,
   wherein first locking means are provided to lock the first with the second portions and the third with the fourth portions in a desired position in which said first horizontal CB contacts and said second horizontal CB contacts are positioned on a substantially same vertical plane.

2. The retrofitting device according to claim 1, wherein in said unlocked condition said first portions and said second portions are free to move vertically with respect to each other, and said third portions and said fourth portions are free to move vertically with respect to each other.

3. The retrofitting device according to claim 1, wherein said fourth portions of said second connection elements are L shaped with a vertical arm linked to the corresponding third portion and a horizontal arm protruding in the direction of said first bar assembly.

4. The retrofitting device according to claim 1, wherein, with reference to a front view of said device, said first bar assembly is in a forward vertical plane with respect to said second bar assembly, and the second horizontal plane of said second horizontal CB contacts is at a lower level with respect to the first horizontal plane of said first horizontal CB contacts.

5. The retrofitting device according to claim 3, wherein said second bar assembly comprises third connection elements linked to the horizontal arm of the fourth portions of a corresponding second connection element and free to move in a horizontal plane with respect to said second connection element when in an unlocked condition, second locking means being provided to lock the third connection elements with the corresponding second connection elements.

6. The retrofitting device according to claim 5, wherein said third connection elements are L shaped with a horizontal arm linked to the fourth portion of the corresponding second connection elements and a vertical arm supporting a corresponding second horizontal CB contact.

7. The retrofitting device according to claim 1, wherein any one of said first portion and second portion and any one of said third portion and fourth portion is provided with at least a slot, the remaining one of said first portion and second portion and the remaining one of said third portion and fourth portion is provided with at least a through hole, a first pin being inserted into said slot and through hole, said first locking means locking rotation and/or translation of said first portion and second portion, and of said third portion and fourth portion with respect to said first pin.

8. The retrofitting device according to claim 7, wherein said first locking means comprise screw means to lock rotation and/or translation of said first portion and second portion, and of said third portion and fourth portion with respect to said first pin.

9. The retrofitting device according to claim 5, wherein any one of said third connection elements and horizontal arm of the fourth portions is provided with at least a slot, the remaining one of said third connection elements and horizontal arm of the fourth portions is provided with at least a through hole, a third pin being inserted into said slot and through hole, said second locking means locking rotation and/or translation of said third connection elements and horizontal arm of the fourth portions with respect to said third pin.

10. The retrofitting device according to claim 9, wherein said second locking means comprise screw means to lock rotation and/or translation of said third connection elements and horizontal arm of the fourth portions with respect to said third pin.

11. The retrofitting device according to claim 1, further comprising a plurality of spacing insulators connecting said second portion of the first connection elements with a corresponding fourth portion of the second connection elements.

12. The retrofitting device according to claim 1, further comprising a basement having an adjustable frame, a plurality of supporting insulator being positioned on said adjustable frame, each of said supporting insulator being connected to a corresponding second connection element of said second bar assembly.

13. The retrofitting device according to claim 1, further comprising insulating pipes positioned around at least a portion of said first and/or second connection elements, said insulating pipes preferably including a compressible gasket.

14. The retrofitting device according to claim 1, further comprising insulating protections positioned at least in correspondence of each of said first and second horizontal CB contacts.

15. A medium voltage panel comprising a circuit breaker compartment, wherein the retrofitting device according to claim 1 is mounted inside said circuit breaker compartment.

16. The retrofitting device according to claim 2, wherein said fourth portions of said second connection elements are L shaped with a vertical arm linked to the corresponding third portion and a horizontal arm protruding in the direction of said first bar assembly.

17. The retrofitting device according to claim 16, wherein, with reference to a front view of said device, said first bar assembly is in a forward vertical plane with respect to said second bar assembly, and the second horizontal plane of said second horizontal CB contacts is at a lower level with respect to the first horizontal plane of said first horizontal CB contacts.

18. The retrofitting device according to claim 17, wherein said second bar assembly comprises third connection elements linked to the horizontal arm of the fourth portions of a corresponding second connection element and free to move in a horizontal plane with respect to said second connection element when in an unlocked condition, second locking means being provided to lock the third connection elements with the corresponding second connection elements.

19. The retrofitting device according to claim 18, wherein said third connection elements are L shaped with a horizontal arm linked to the fourth portion of the corresponding second connection elements and a vertical arm supporting a corresponding second horizontal CB contact.

20. The retrofitting device according to claim 19, wherein any one of said first portion and second portion and any one of said third portion and fourth portion is provided with at least a slot, the remaining one of said first portion and second portion and the remaining one of said third portion and fourth portion is provided with at least a through hole, a first pin being inserted into said slot and through hole, said first locking means locking rotation and/or translation of said first portion and second portion, and of said third portion and fourth portion with respect to said first pin.

* * * * *